(12) United States Patent
Peng

(10) Patent No.: US 9,380,662 B1
(45) Date of Patent: Jun. 28, 2016

(54) LIGHT EMITTING DIODE DRIVING SYSTEM WITH LIGHTING SIGNALS CARRIED VIA POWER LINES

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 14/626,533

(22) Filed: Feb. 19, 2015

(51) Int. Cl.
*H05B 33/08* (2006.01)

(52) U.S. Cl.
CPC .................................. *H05B 33/0815* (2013.01)

(58) Field of Classification Search
CPC .................................................. H05B 33/0815
USPC ......................................................... 315/193
See application file for complete search history.

(56) References Cited

U.S. PATENT DOCUMENTS

| | | | |
|---|---|---|---|
| 8,970,136 B2* | 3/2015 | Kikuchi | ........................ 315/291 |
| 2012/0074866 A1* | 3/2012 | Zhang | ................ H05B 33/0815 315/291 |
| 2012/0223649 A1* | 9/2012 | Saes | ...................... H05B 33/083 315/186 |
| 2013/0241433 A1* | 9/2013 | Ge | ...................... H05B 33/0815 315/224 |
| 2014/0265908 A1* | 9/2014 | Su | ...................... H05B 33/0815 315/224 |

\* cited by examiner

*Primary Examiner* — Dylan White
(74) *Attorney, Agent, or Firm* — Muncy, Geissler, Olds & Lowe, P.C.

(57) ABSTRACT

A light emitting diode driving system is applied to a light emitting diode lamp string, such that the light signal is carried through a power line to reduce the signal transmission lines. The light emitting diode driving system includes a switch unit, a control unit and a light signal generating unit. The switch unit includes a power input side, a power output side and a controlled side. The power output side is electrically connected to the light emitting diode lamp string. The control unit is electrically connected to the switch unit. The light signal generating unit is electrically connected to the control unit and the power output side. The light signal generating unit generates a light signal when the control unit turns off the switch unit. The light signal generating unit sends the light signal to the light emitting diode lamp string.

10 Claims, 6 Drawing Sheets

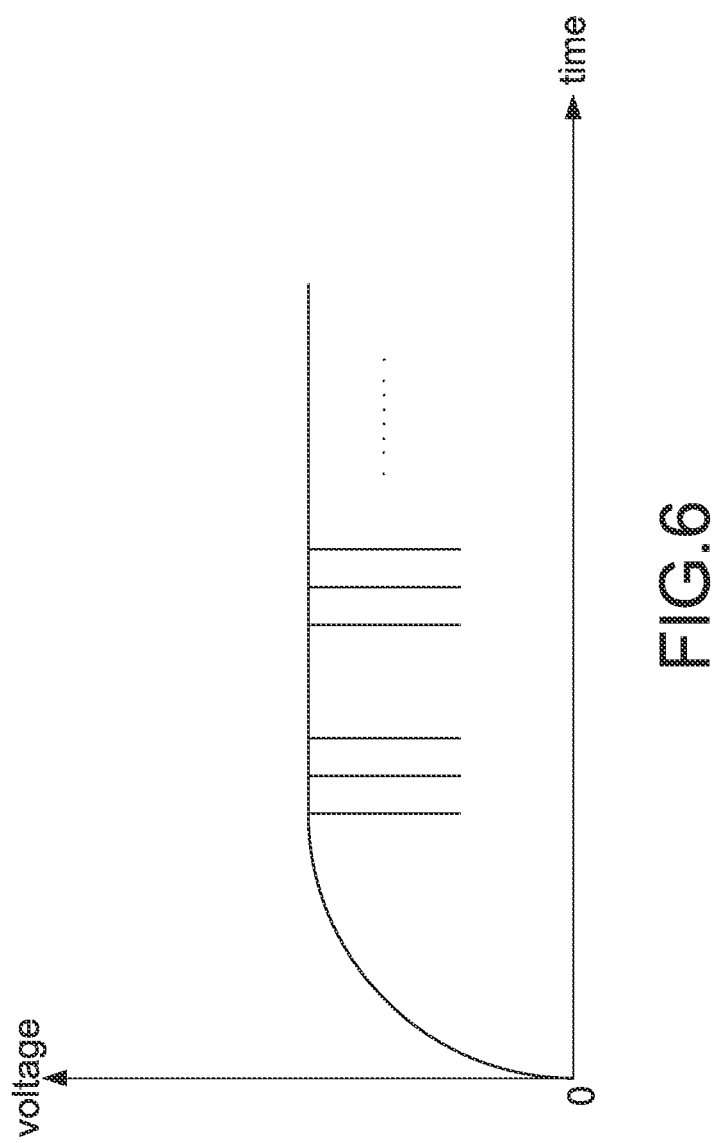

LIGHT EMITTING DIODE DRIVING SYSTEM WITH LIGHTING SIGNALS CARRIED VIA POWER LINES

BACKGROUND OF THE INVENTION

1. Field of the Invention

The present invention relates to a driving system, and especially relates to a light emitting diode driving system.

2. Description of the Related Art

Nowadays, the connection types of the light emitting diode lamp string modules are separated into two types: the serial-type connection and the parallel-type connection. The light emitting diode lamp string modules are widely used for external walls of the building, decoration of trees, signboards, and scenery designing.

In the related art serial-type light emitting diode lamp string modules, a plurality of light emitting diode lamp string modules are commonly connected in series. Also, the amount of the light emitting diode lamp string modules is determined according to the volume of the decorated objects. In addition, all of the light emitting diode lamp string modules are controlled by the same controller which initially controls the first light emitting diode lamp string module.

Although the light emitting diode lamp string modules are easily connected together, the remaining light emitting diode lamp string modules behind the abnormal light emitting diode lamp string module cannot be lighted even only one of the light emitting diode lamp string modules is abnormal. That is because the control signal cannot be sent to drive all of the remaining light emitting diode lamp string modules.

The parallel-type light emitting diode lamp string modules are connected to the controller in parallel. Accordingly, each one of the light emitting diode lamp string modules is controlled by the controller through a control line and an address line, respectively. For example, ten control lines and ten address lines need to be used when ten light emitting diode lamp string modules are employed to be connected in parallel.

The remaining light emitting diode lamp string modules can still be normally controlled when one of the light emitting diode lamp string modules is abnormal. However, the amount of the control lines and the address lines increase proportionally. Therefore, complexity and the costs of the equipment also increase when the amount of the light emitting diode lamp string modules increases.

No matter the connection type of the light emitting diode lamp string modules is the serial-type or the parallel-type, many power transmission lines and signal transmission lines need to be used to control the colors and intensities of the light emitting diode lamp string modules. Accordingly, cost down can be achieved only if the amount of the power transmission lines or the signal transmission lines can be reduced.

SUMMARY OF THE INVENTION

In order to solve the above-mentioned problems, an object of the present invention is to provide a light emitting diode driving system.

In order to achieve the object of the present invention mentioned above, the light emitting diode driving system is applied to a light emitting diode lamp string. The light emitting diode driving system comprises a switch unit, a control unit and a light signal generating unit. The switch unit comprises a power input side, a power output side and a controlled side. The power output side is electrically connected to the light emitting diode lamp string. The control unit is electrically connected to the switch unit. The light signal generating unit is electrically connected to the control unit and the power output side. The light signal generating unit generates a light signal when the control unit turns off the switch unit. The light signal generating unit sends the light signal to the light emitting diode lamp string.

The advantage of the present invention is that the light signal is carried through the power line to reduce the signal transmission lines.

BRIEF DESCRIPTION OF DRAWING

FIG. 6 shows a waveform diagram of an embodiment of the light signal of the present invention.

DETAILED DESCRIPTION OF THE INVENTION

Please refer to following detailed description and figures for the technical content of the present invention. The following detailed description and figures are referred for the present invention, but the present invention is not limited to it.

Figure 1:
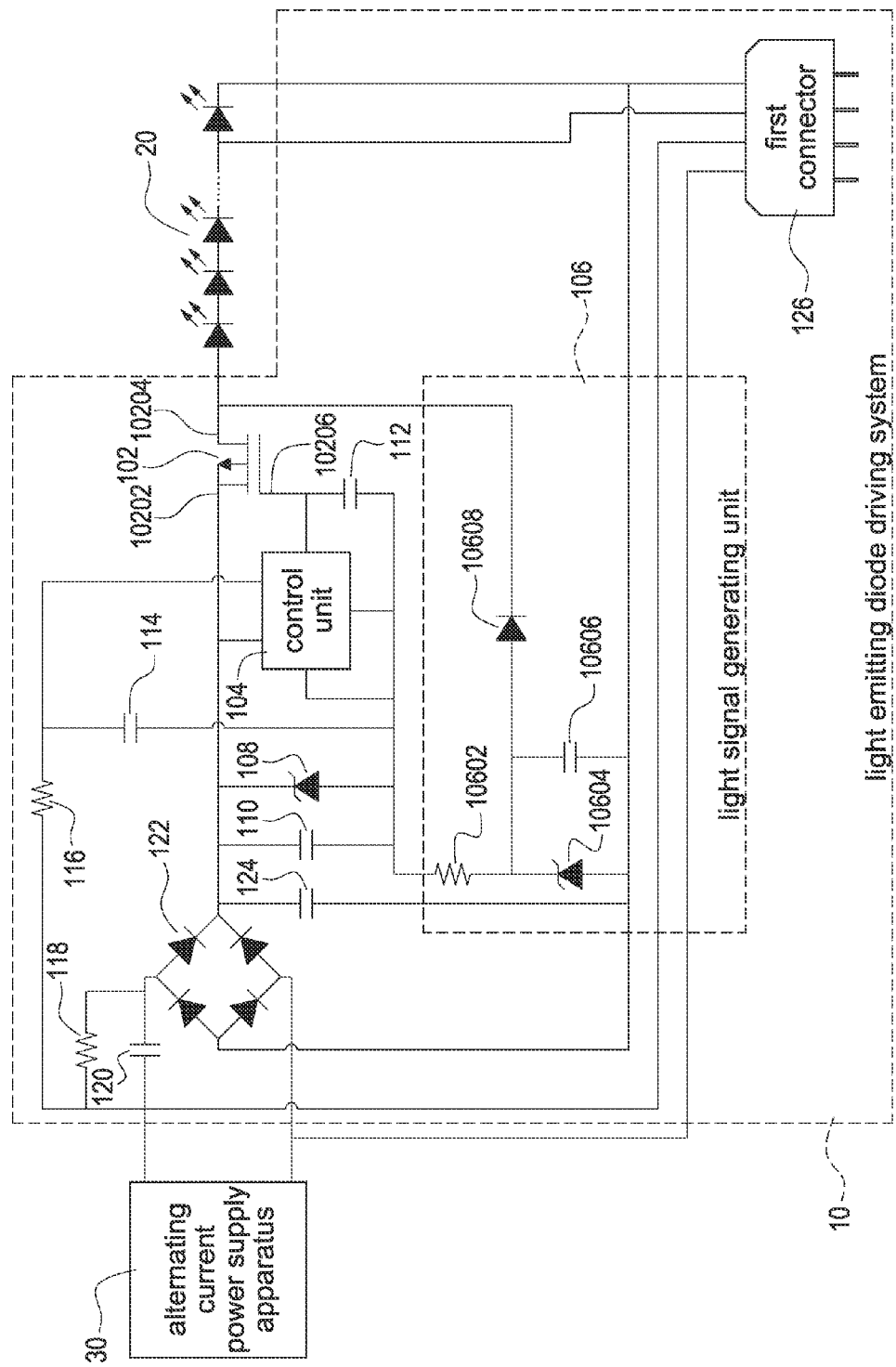
FIG. 1 shows a block diagram of the first embodiment of the light emitting diode driving system of the present invention.

FIG. 1 shows a block diagram of the first embodiment of the light emitting diode driving system of the present invention. A light emitting diode driving system 10 is applied to a light emitting diode lamp string 20 and an alternating current power supply apparatus 30. The light emitting diode driving system 10 comprises a switch unit 102, a control unit 104, a light signal generating unit 106, a Zener diode 108, a first capacitor 110, a second capacitor 112, a third capacitor 114, a first resistor 116, a bridge side resistor 118, a load capacitor 120, a bridge rectifier 122, a filtering capacitor 124 and a first connector 126.

The switch unit 102 comprises a power input side 10202, a power output side 10204 and a controlled side 10206. The light signal generating unit 106 comprises a voltage-dividing resistor 10602, a signal generating side Zener diode 10604, a signal generating side capacitor 10606 and a signal generating side diode 10608.

The power output side 10204 is electrically connected to the light emitting diode lamp string 20. The control unit 104 is electrically connected to the switch unit 102. The light signal generating unit 106 is electrically connected to the control unit 104 and the power output side 10204. The Zener diode 108 is electrically connected to the control unit 104. The first capacitor 110 is electrically connected to the control unit 104. The second capacitor 112 is electrically connected to the control unit 104 and the controlled side 10206. The third capacitor 114 is electrically connected to the control unit 104. The first resistor 116 is electrically connected to the third capacitor 114. The bridge side resistor 118 is electrically connected to the first resistor 116. The load capacitor 120 is electrically connected to the bridge side resistor 118. The bridge rectifier 122 is electrically connected to the control unit 104 and the power input side 10202. The filtering capacitor 124 is electrically connected to the control unit 104 and the power input side 10202. The first connector 126 is electrically connected to the light emitting diode lamp string 20, the alternating current power supply apparatus 30, the bridge rectifier 122, the first resistor 116 and the bridge side resistor 118. The voltage-dividing resistor 10602 is electrically connected to the control unit 104. The signal generating side Zener diode 10604 is electrically connected to the voltage-dividing resistor 10602. The signal generating side capacitor 10606 is electrically connected to the voltage-dividing resistor 10602. The signal generating side diode 10608 is electrically connected to the voltage-dividing resistor 10602 and the power output side 10204.

The light signal generating unit 106 generates a light signal when the control unit 104 turns off the switch unit 102. The light signal generating unit 106 sends the light signal to the light emitting diode lamp string 20. FIG. 6 shows a waveform diagram of an embodiment of the light signal of the present invention.

Moreover, an alternating current power is converted into a direct current power after the alternating current power sent from the alternating current power supply apparatus 30 is processed by the load capacitor 120, the bridge rectifier 122, the filtering capacitor 124, the first capacitor 110 and so on. When the light signal is not generated and sent, the control unit 104 turns on the switch unit 102, so that the direct current power is sent to the light emitting diode lamp string 20 to drive the light emitting diode lamp string 20. The light signal generating unit 106 receives the direct current power and generates the light signal when the control unit 104 turns off the switch unit 102. The light signal generating unit 106 sends the light signal to the light emitting diode lamp string 20. The light emitting diode lamp string 20 is driven to light diversely after the light emitting diode lamp string 20 receives the light signal.

The light signal is a pulse wave signal. The signal generating side Zener diode 10604 is used to determine an amplitude of the pulse wave signal. The switch unit 102 is a PMOS. The Zener diode 108 is used to provide the control unit 104 with a driving power. The first capacitor 110 is used to filter. The voltage-dividing resistor 10602 is used to divide a voltage. The signal generating side capacitor 10606 is used to filter. The signal generating side diode 10608 is used to rectify.

The load capacitor 120 is used as a load. For example, the alternating current power is 110 volts. Each of the light emitting diodes of the light emitting diode lamp string 20 consumes 3 volts. Then, the light emitting diode lamp string 20 can comprise about 36 light emitting diodes. The redundant energy will be absorbed by the load capacitor 120 if the light emitting diode lamp string 20 actually comprises only 26 light emitting diodes.

Figure 2:
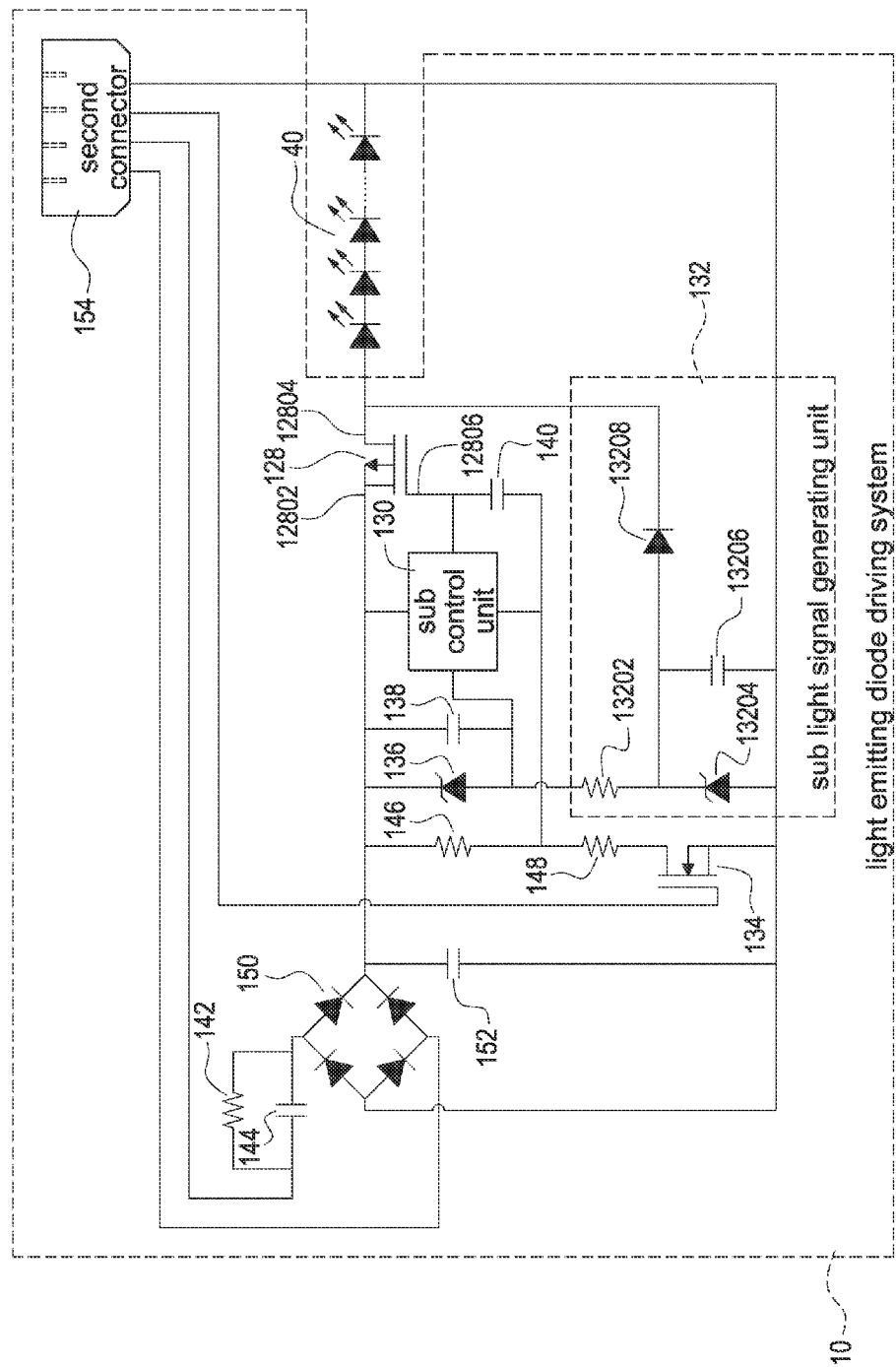
FIG. 2 shows a block diagram of the second embodiment of the light emitting diode driving system of the present invention.

FIG. 2 shows a block diagram of the second embodiment of the light emitting diode driving system of the present invention. Please refer to FIG. 1 as well. The light emitting diode driving system 10 shown in FIG. 2 can be connected to the light emitting diode driving system 10 shown in FIG. 1 through a second connector 154 and the first connector 126. In another word, in an embodiment, the light emitting diode driving system 10 shown in FIG. 1 can be an independent light emitting diode driving system. In another embodiment, the light emitting diode driving system 10 shown in FIG. 1 can be one part of the light emitting diode driving system 10, while the light emitting diode driving system 10 shown in FIG. 2 is the other part of the light emitting diode driving system 10.

The light emitting diode driving system 10 is further applied to a sub light emitting diode lamp string 40. The light emitting diode driving system 10 further comprises a sub switch unit 128, a sub control unit 130, a sub light signal generating unit 132, a switch subunit 134, a sub Zener diode 136, a sub first capacitor 138, a sub second capacitor 140, a sub bridge side resistor 142, a sub load capacitor 144, a first voltage-dividing resistor 146, a second voltage-dividing resistor 148, a sub bridge rectifier 150, a sub filtering capacitor 152 and the second connector 154.

The sub switch unit 128 comprises a sub power input side 12802, a sub power output side 12804 and a sub controlled side 12806. The sub light signal generating unit 132 comprises a sub voltage-dividing resistor 13202, a sub signal generating side Zener diode 13204, a sub signal generating side capacitor 13206 and a sub signal generating side diode 13208.

The sub power output side 12804 is electrically connected to the sub light emitting diode lamp string 40. The sub power input side 12802 is electrically connected to the control unit 104. The sub control unit 130 is electrically connected to the sub switch unit 128. The sub light signal generating unit 132 is electrically connected to the sub control unit 130 and the sub power output side 12804. The switch subunit 134 is electrically connected to the sub control unit 130 and the light emitting diode lamp string 20. The sub Zener diode 136 is electrically connected to the sub control unit 130. The sub first capacitor 138 is electrically connected to the sub control unit 130. The sub second capacitor 140 is electrically connected to the sub control unit 130 and the sub controlled side 12806. The sub bridge side resistor 142 is electrically connected to the sub control unit 130. The sub load capacitor 144 is electrically connected to the sub bridge side resistor 142. The first voltage-dividing resistor 146 is electrically connected to the sub control unit 130. The second voltage-dividing resistor 148 is electrically connected to the first voltage-dividing resistor 146 and the switch subunit 134. The sub bridge rectifier 150 is electrically connected to the sub control unit 130 and the sub power input side 12802. The sub filtering capacitor 152 is electrically connected to the sub control unit 130 and the sub power input side 12802. The second connector 154 is electrically connected to the sub bridge rectifier 150, the sub bridge side resistor 142, the sub load capacitor 144, the switch subunit 134, the sub light emitting diode lamp string 40 and the alternating current power supply apparatus 30. The sub voltage-dividing resistor 13202 is electrically connected to the sub control unit 130. The sub signal generating side Zener diode 13204 is electrically connected to the sub voltage-dividing resistor 13202. The sub signal generating side capacitor 13206 is electrically connected to the sub voltage-dividing resistor 13202. The sub signal generating side diode 13208 is electrically connected to the sub voltage-dividing resistor 13202 and the sub power output side 12804.

The switch subunit 134 is turned on when the switch subunit 134 receives the light signal. When the switch subunit 134 is turned on, the sub control unit 130 detects that the switch subunit 134 is turned on, and then the sub control unit 130 turns off the sub switch unit 128, and then the sub light signal generating unit 132 generates a sub light signal. The sub light signal generating unit 132 sends the sub light signal to the sub light emitting diode lamp string 40. In another word, the sub light signal is equal to the light signal. Therefore, a light pattern of the sub light emitting diode lamp string 40 is the same with a light pattern of the light emitting diode lamp string 20.

Moreover, the alternating current power is converted into a sub direct current power after the alternating current power sent from the alternating current power supply apparatus 30 is processed by the sub load capacitor 144, the sub bridge rectifier 150, the sub filtering capacitor 152 and so on. The switch subunit 134 is turned off when the switch subunit 134 does not receive the light signal. When the switch subunit 134 is turned off, the sub control unit 130 detects that the switch subunit 134 is turned off, and then the sub control unit 130 turns on the sub switch unit 128, and then the sub direct current power is sent to the sub light emitting diode lamp string 40 to drive the sub light emitting diode lamp string 40.

The switch subunit 134 is turned on when the switch subunit 134 receives the light signal. When the switch subunit 134 is turned on, the sub control unit 130 detects that the switch subunit 134 is turned on, and then the sub control unit 130 turns off the sub switch unit 128, and then the sub light signal generating unit 132 receives the sub direct current and generates the sub light signal. The sub light signal generating unit 132 sends the sub light signal to the sub light emitting diode lamp string 40. The sub light emitting diode lamp string 40 is driven to light diversely after the sub light emitting diode lamp string 40 receives the sub light signal.

The sub light signal is a pulse wave signal. The sub signal generating side Zener diode 13204 is used to determine an amplitude of the pulse wave signal. The sub switch unit 128 is a PMOS. The switch subunit 134 is a NMOS. The sub Zener diode 136 is used to provide the sub control unit 130 with a driving power. The sub first capacitor 138 is used to filter. The sub voltage-dividing resistor 13202 is used to divide a voltage. The sub signal generating side capacitor 13206 is used to filter. The sub signal generating side diode 13208 is used to rectify. The sub load capacitor 144 is used as a load. For example, the alternating current power is 110 volts. Each of the light emitting diodes of the sub light emitting diode lamp string 40 consumes 3 volts. Then, the sub light emitting diode lamp string 40 can comprise about 36 light emitting diodes. The redundant energy will be absorbed by the sub load capacitor 144 if the sub light emitting diode lamp string 40 actually comprises only 26 light emitting diodes.

Figure 3:
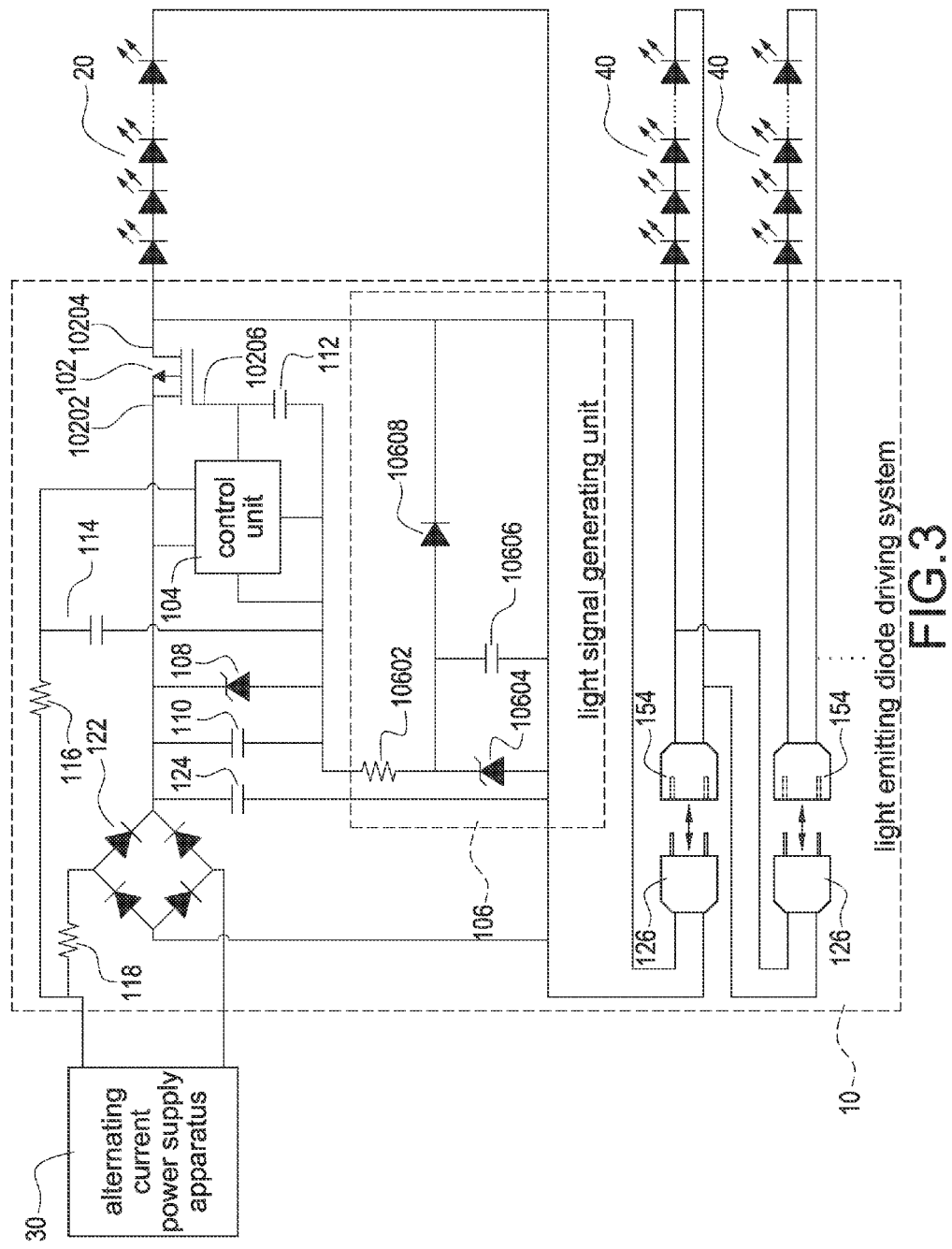
FIG. 3 shows a block diagram of the third embodiment of the light emitting diode driving system of the present invention.

FIG. 3 shows a block diagram of the third embodiment of the light emitting diode driving system of the present invention. The description for the elements shown in FIG. 3, which are similar to those shown in FIG. 1, is not repeated here for brevity. Moreover, the light emitting diode driving system 10 is further applied to at least a sub light emitting diode lamp string 40. The light emitting diode driving system 10 further comprises at least a first connector 126 and at least a second connector 154. The first connector 126 is electrically connected to the power output side 10204 and the light signal generating unit 106. The second connector 154 is electrically connected to the first connector 126 and the sub light emitting diode lamp string 40.

The light signal generating unit 106 generates the light signal when the control unit 104 turns off the switch unit 102. The light signal generating unit 106 sends the light signal to the sub light emitting diode lamp string 40 through the first connector 126 and the second connector 154. A quantity of the light emitting diodes of the light emitting diode lamp string 20 is equal to a quantity of the light emitting diodes of the sub light emitting diode lamp string 40. For example, the alternating current power is 110 volts. Each of the light emitting diodes consumes 3 volts. Then, there are total about 36 light emitting diodes. If there are two sub light emitting diode lamp strings 40 as shown in FIG. 3, there are 12 light emitting diodes in the light emitting diode lamp string 20, and there are 12 light emitting diodes in each of the light emitting diode lamp strings 20 as well.

Please refer to FIG. 1 again. In an embodiment of the present invention, the first connector 126 is removed. A plurality of the light emitting diode lamp strings 20 driven by a plurality of the light emitting diode driving systems 10 light diversely synchronously according to the bridge side resistor 118, the first resistor 116 and the third capacitor 114 when a plurality of the light emitting diode driving systems 10 are parallel and are used.

Figure 4:
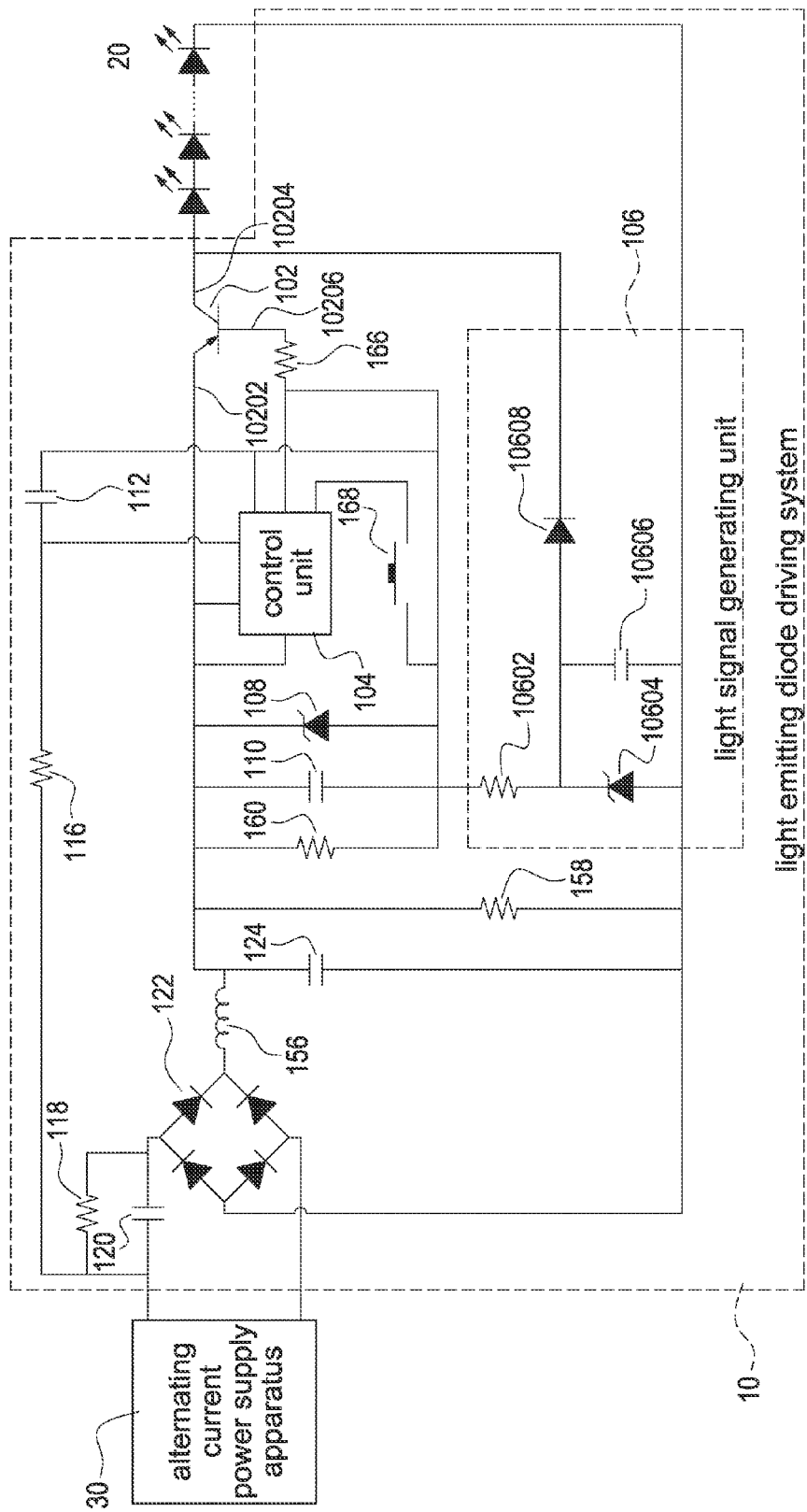
FIG. 4 shows a block diagram of the fourth embodiment of the light emitting diode driving system of the present invention.

FIG. 4 shows a block diagram of the fourth embodiment of the light emitting diode driving system of the present invention. The description for the elements shown in FIG. 4, which are similar to those shown in FIG. 1, is not repeated here for brevity. The light emitting diode driving system 10 further comprises a Zener diode 108, a first capacitor 110, a second capacitor 112, a first resistor 116, a bridge side resistor 118, a load capacitor 120, a bridge rectifier 122, a filtering capacitor 124, an inductor 156, a second resistor 158, a third resistor 160, a fourth resistor 166 and a button 168.

The Zener diode 108 is electrically connected to the control unit 104. The first capacitor 110 is electrically connected to the control unit 104. The second capacitor 112 is electrically connected to the control unit 104. The first resistor 116 is electrically connected to the control unit 104. The bridge side resistor 118 is electrically connected to the first resistor 116. The load capacitor 120 is electrically connected to the bridge side resistor 118. The bridge rectifier 122 is electrically connected to the bridge side resistor 118 and the load capacitor 120. The filtering capacitor 124 is electrically connected to the control unit 104. The inductor 156 is electrically connected to the bridge rectifier 122 and the control unit 104. The second resistor 158 is electrically connected to the control unit 104. The third resistor 160 is electrically connected to the control unit 104. The fourth resistor 166 is electrically connected to the control unit 104 and the controlled side 10206. The button 168 is electrically connected to the control unit 104.

Moreover, the inductor 156 is used to filter surges. The fourth resistor 166 is used to limit currents and keep the switch unit 102 to be turned on when the control unit 104 controls the switch unit 102. The control unit 104 has a reset action time. In the reset action time, the switch unit 102 maybe be turned on or off because an output signal of the control unit 104 is unknown. The fourth resistor 166 can maintain that the switch unit 102 is turned on in the reset action time.

Moreover, the control unit 104 receives a pressing signal when the button 168 is pressed. The control unit 104 generates different signals, and the different signals are sent through the output pins, wherein the control unit 104 controls the switch unit 102 through the output pins, so that the light emitting diode lamp string 20 lights diversely. The present invention can have remote functions as well, and actions of the remote functions are similar to actions of pressing the button 168.

Figure 5:
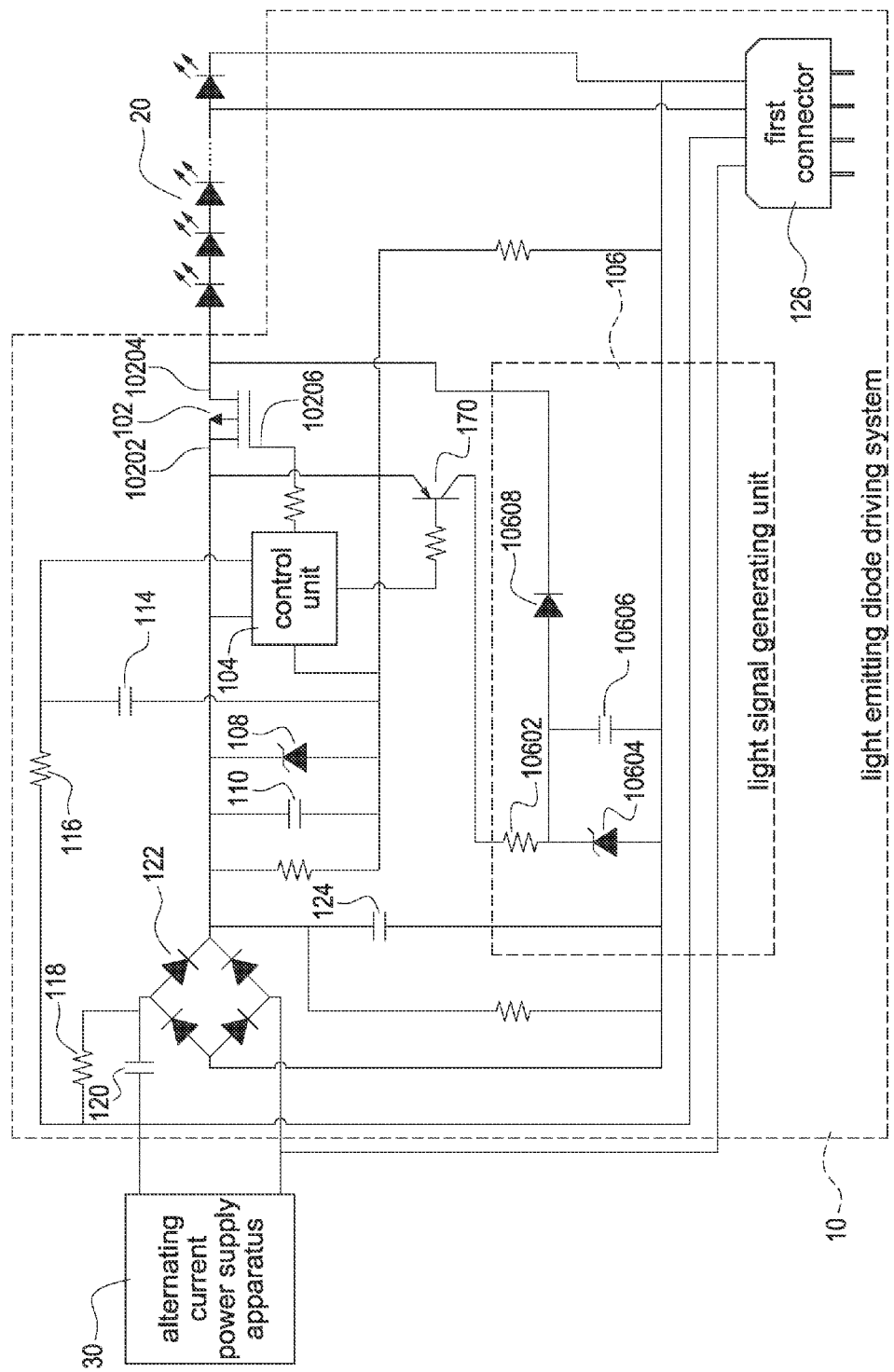
FIG. 5 shows a block diagram of the fifth embodiment of the light emitting diode driving system of the present invention.

FIG. 5 shows a block diagram of the fifth embodiment of the light emitting diode driving system of the present invention. The description for the elements shown in FIG. 5, which are similar to those shown in FIGS. 1~4, is not repeated here for brevity. Moreover, the light emitting diode driving system 10 further comprises a transistor switch 170 electrically connected to the control unit 104, the power input side 10202 and the voltage-dividing resistor 10602. The transistor switch 170 is controlled by the control unit 104. When the switch unit 102 is turned off, the transistor switch 170 is turned on, so that the light signal generating unit 106 starts working as mentioned above. When the switch unit 102 is turned on, the transistor switch 170 is turned off. Moreover, the switch unit 102 and the transistor switch 170 can be turned off at the same time, and then the light emitting diode driving system 10 enters a standby mode.

The advantage of the present invention is that the light signal is carried through the power line to reduce the signal transmission lines.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light emitting diode driving system with lighting signals carried via power lines, the light emitting diode driving system applied to a light emitting diode lamp string, the light emitting diode driving system comprising:
    a switch unit comprising a power input side, a power output side and a controlled side, the power output side electrically connected to the light emitting diode lamp string;
    a control unit electrically connected to the switch unit; and
    a light signal generating unit electrically connected to the control unit and the power output side,
    wherein the light signal generating unit generates a light signal when the control unit turns off the switch unit; the light signal generating unit sends the light signal to the light emitting diode lamp string.

2. The light emitting diode driving system in claim 1, wherein the light signal generating unit comprises:
    a voltage-dividing resistor electrically connected to the control unit;
    a signal generating side zener diode electrically connected to the voltage-dividing resistor;
    a signal generating side capacitor electrically connected to the voltage-dividing resistor; and
    a signal generating side diode electrically connected to the voltage-dividing resistor and the power output side.

3. The light emitting diode driving system in claim 2, further comprising:
    a zener diode electrically connected to the control unit;
    a first capacitor electrically connected to the control unit;
    a second capacitor electrically connected to the control unit and the controlled side;
    a third capacitor electrically connected to the control unit;
    a first resistor electrically connected to the third capacitor;
    a bridge side resistor electrically connected to the first resistor; and
    a load capacitor electrically connected to the bridge side resistor.

4. The light emitting diode driving system in claim 1, further applied to a sub light emitting diode lamp string, the light emitting diode driving system further comprising:
    a sub switch unit comprising a sub power input side, a sub power output side and a sub controlled side, the sub power output side electrically connected to the sub light emitting diode lamp string, the sub power input side electrically connected to the control unit;
    a sub control unit electrically connected to the sub switch unit;
    a sub light signal generating unit electrically connected to the sub control unit and the sub power output side; and
    a switch subunit electrically connected to the sub control unit and the light emitting diode lamp string,
    wherein the switch subunit is turned on when the switch subunit receives the light signal;
    wherein when the switch subunit is turned on, the sub control unit detects that the switch subunit is turned on, and then the sub control unit turns off the sub switch unit, and then the sub light signal generating unit generates a sub light signal; the sub light signal generating unit sends the sub light signal to the sub light emitting diode lamp string.

5. The light emitting diode driving system in claim 4, wherein the sub light signal generating unit comprises:
    a sub voltage-dividing resistor electrically connected to the sub control unit;
    a sub signal generating side zener diode electrically connected to the sub voltage-dividing resistor;
    a sub signal generating side capacitor electrically connected to the sub voltage-dividing resistor; and
    a sub signal generating side diode electrically connected to the sub voltage-dividing resistor and the sub power output side.

6. The light emitting diode driving system in claim 5, further comprising:
    a sub zener diode electrically connected to the sub control unit;
    a sub first capacitor electrically connected to the sub control unit;
    a sub second capacitor electrically connected to the sub control unit and the sub controlled side;
    a sub bridge side resistor electrically connected to the sub control unit;
    a sub load capacitor electrically connected to the sub bridge side resistor;
    a first voltage-dividing resistor electrically connected to the sub control unit; and
    a second voltage-dividing resistor electrically connected to the first voltage-dividing resistor and the switch subunit.

7. The light emitting diode driving system in claim 1, further applied to at least a sub light emitting diode lamp string, the light emitting diode driving system further comprising:
    at least a first connector electrically connected to the power output side and the light signal generating unit; and
    at least a second connector electrically connected to the first connector and the sub light emitting diode lamp string,
    wherein the light signal generating unit generates the light signal when the control unit turns off the switch unit; the light signal generating unit sends the light signal to the sub light emitting diode lamp string through the first connector and the second connector;
    wherein a quantity of light emitting diodes of the light emitting diode lamp string is equal to a quantity of light emitting diodes of the sub light emitting diode lamp string.

8. The light emitting diode driving system in claim 1, wherein the light signal generating unit comprises:
    a signal generating side capacitor electrically connected to the switch unit; and
    a signal generating side resistor electrically connected to the switch unit.

9. The light emitting diode driving system in claim 8, further comprising:
    a zener diode electrically connected to the control unit;
    a first capacitor electrically connected to the control unit;
    a second capacitor electrically connected to the control unit;
    a first resistor electrically connected to the control unit;

a bridge side resistor electrically connected to the first resistor;

a load capacitor electrically connected to the bridge side resistor;

a bridge rectifier electrically connected to the bridge side resistor and the load capacitor; and a filtering capacitor electrically connected to the control unit.

10. The light emitting diode driving system in claim 9, further comprising:

an inductor electrically connected to the bridge rectifier and the control unit;

a second resistor electrically connected to the control unit;

a third resistor electrically connected to the control unit;

a fourth resistor electrically connected to the control unit and the controlled side; and a button electrically connected to the control unit.

* * * * *